United States Patent
Park et al.

(10) Patent No.: US 12,223,411 B2
(45) Date of Patent: Feb. 11, 2025

(54) ELECTRONIC APPARATUS AND METHOD OF CONTROLLING THEREOF

(71) Applicant: SAMSUNG ELECTRONICS CO., LTD., Suwon-si (KR)

(72) Inventors: Chiyoun Park, Suwon-si (KR); Jaedeok Kim, Suwon-si (KR); Hyunjoo Jung, Suwon-si (KR); Inkwon Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 979 days.

(21) Appl. No.: 17/053,005

(22) PCT Filed: May 30, 2019

(86) PCT No.: PCT/KR2019/006500
§ 371 (c)(1),
(2) Date: Nov. 4, 2020

(87) PCT Pub. No.: WO2019/245186
PCT Pub. Date: Dec. 26, 2019

(65) Prior Publication Data
US 2021/0125028 A1 Apr. 29, 2021

(30) Foreign Application Priority Data
Jun. 19, 2018 (KR) .................. 10-2018-0070374

(51) Int. Cl.
*G06N 3/04* (2023.01)
*G06N 3/08* (2023.01)

(52) U.S. Cl.
CPC ............... *G06N 3/04* (2013.01); *G06N 3/08* (2013.01)

(58) Field of Classification Search
None
See application file for complete search history.

(56) References Cited

U.S. PATENT DOCUMENTS

| | | |
|---|---|---|
| 6,453,206 B1 | 9/2002 | Soraghan et al. |
| 7,240,039 B2 | 7/2007 | Kirshenbaum |

(Continued)

FOREIGN PATENT DOCUMENTS

| | | | |
|---|---|---|---|
| JP | 3401858 B2 | 4/2003 | |
| KR | 10-1763869 B1 | 8/2017 | |
| KR | 10-2018-0045635 A | 5/2018 | |
| KR | 10-2018-0049786 A | 5/2018 | |
| WO | WO-2016145516 A1 * | 9/2016 | ............... G06F 7/58 |
| WO | 2018/005433 A1 | 1/2018 | |

(Continued)

OTHER PUBLICATIONS

S. Russell and P. Norvig, Artificial Intelligence: A Modern Approach, 2nd Ed., 2003, chapt 18-21, pp. 649-789. (Year: 2003).*

(Continued)

*Primary Examiner* — Vincent Gonzales
(74) *Attorney, Agent, or Firm* — Sughrue Mion, PLLC

(57) ABSTRACT

A method of controlling an electronic apparatus for generating an artificial intelligence model is disclosed. The method includes based on a user command for using a plurality of artificial intelligence models being input, generating the plurality of artificial intelligence models, and inputting input data to the generated artificial intelligence model to obtain output data with respect to the input data, wherein the generating includes, based on a reference value for obtaining a layer parameter with respect to layers at corresponding locations among a plurality of layers included in each of the plurality of artificial intelligence model, generating layers at corresponding locations among layers included in each of the plurality of artificial intelligence models.

8 Claims, 19 Drawing Sheets

(56) References Cited

U.S. PATENT DOCUMENTS

| | | |
|---|---|---|
| 9,524,450 B2 | 12/2016 | Ravindran et al. |
| 2017/0024642 A1 | 1/2017 | Xiong et al. |
| 2017/0169326 A1 | 6/2017 | Diamos et al. |
| 2017/0344808 A1 | 11/2017 | El-Khamy et al. |
| 2018/0053090 A1 | 2/2018 | Voelker et al. |
| 2018/0114110 A1 | 4/2018 | Han et al. |
| 2018/0121732 A1 | 5/2018 | Kim et al. |
| 2019/0370659 A1* | 12/2019 | Dean ................. G06N 3/086 |

FOREIGN PATENT DOCUMENTS

WO          2018/063840 A1   4/2018

OTHER PUBLICATIONS

International Search Report (PCT/ISA/210) issued Sep. 24, 2019 by the International Searching Authority in counterpart International Patent Application No. PCT/KR2019/006500.

Written Opinion (PCT/ISA/237) issued Sep. 24, 2019 by the International Searching Authority in counterpart International Patent Application No. PCT/KR2019/006500.

Klemm, Sören et al., "Barista—a Graphical Tool for Designing and Training Deep Neural Networks", Feb. 2018, 8 pages total, XP081221517.

Drossu et al., "A Flexible Graphical User Interface for Embedding Heterogeneous Neural Network Simulators", IEEE Transactions On Education, vol. 39, No. 3, Aug. 1996, 8 pages total, XP055730963.

Kirill Neklyudov et al., "Variance Networks: When Expectation Does Not Meet Your Expectations", Mar. 2018, 9 pages total, XP080863312.

Communication dated Jul. 1, 2021 issued by the European Intellectual Property Office in counterpart European Application No. 19823665.5.

Communication issued Sep. 1, 2023 by the Korean Intellectual Property Office in Korean Patent Application No. 10-2018-0070374.

Examination Report issued on May 29, 2024 by the European Patent Office for European Patent Application No. 19823665.5.

\* cited by examiner

Simple Ensemble

Stepwise Ensemble

Stepwise Partial Ensemble

Cascaded Partial Ensemble

Stochastic Partial Ensemble

ELECTRONIC APPARATUS AND METHOD OF CONTROLLING THEREOF

CROSS-REFERENCE TO RELATED APPLICATIONS

This application is a National Phase Entry of PCT International Application No. PCT/KR2019/006500 filed May 30, 2019, which claims priority to Korean Patent Application No. 10-2018-0070374 filed Jun. 19, 2018.

TECHNICAL FIELD

The disclosure relates to an electronic apparatus and a method of controlling thereof. More particularly, the disclosure relates to a method for efficiently using an artificial intelligence model in an electronic apparatus such as a user terminal.

In addition, the disclosure relates to an artificial intelligence (AI) system that simulates functions such as cognition and determination of human brain by using a machine learning algorithm, and its application.

BACKGROUND ART

An artificial intelligence (AI) system is a computer system that realizes intelligence of human-level, and unlike existing rule-based smart systems, machines learn, determine, and become smarter. As the artificial intelligence system is used, its recognition rate improves and the user's taste can be understood more accurately, and the existing rule-based smart system is gradually being replaced by a deep learning-based artificial intelligence system.

The artificial intelligence techniques are formed of element technologies utilizing machine learning (e.g., deep learning) and machine learning.

The machine learning is an algorithm technology for classifying and training features of input data, the element technology is technology that simulates functions such as cognition, determination, etc. of human brains by utilizing the algorithm of the machine learning such deep learning, or the like, and is composed of verbal comprehension, visual comprehension, inference/prediction, knowledge expression, motion control, or the like.

Various fields to which artificial intelligence technology is applied are as follows. Linguistic understanding refers to a technology of recognizing languages/characters of humans, and applying/processing them, and includes natural speech processing, machine translation, communication systems, queries and answers, voice recognition/synthesis, and the like. Visual understanding refers to a technology of recognizing an object in a similar manner to human vision, and processing the object, and includes recognition of an object, tracking of an object, search of an image, recognition of humans, understanding of a scene, understanding of a space, improvement of an image, and the like. Inference/prediction refers to a technology of determining information and then making logical inference and prediction, and includes knowledge/probability-based inference, optimization prediction, preference-based planning, recommendation, and the like. Knowledge representation refers to a technology of automatically processing information of human experiences into knowledge data, and includes knowledge construction (data generation/classification), knowledge management (data utilization), and the like. Operation control refers to a technology of controlling autonomous driving of vehicles and movements of robots, and includes movement control (navigation, collision, driving), operation control (behavior control), and the like.

Meanwhile, the conventional artificial intelligence technology is used by combining a plurality of artificial intelligence models, and thus requires a lot of learning time and a large storage space. Therefore, the conventional artificial intelligence technology is often performed on an external server capable of large storage space and high computation, and it is necessary to discuss a method for efficiently using the artificial intelligence model in a user terminal device such as a smartphone.

DETAILED DESCRIPTION OF THE INVENTION

Technical Problem

The disclosure is to solve the problem described above, and relates to a method for using an artificial intelligence model in a limited storage space.

Technical Solution

According to an embodiment of the disclosure, a method of controlling an electronic apparatus for generating an artificial intelligence model, the method includes, based on a user command for using a plurality of artificial intelligence models being input, generating the plurality of artificial intelligence models, and inputting input data to the generated artificial intelligence model to obtain output data with respect to the input data, wherein the generating includes, based on a reference value for obtaining a layer parameter with respect to layers at corresponding locations among a plurality of layers included in each of the plurality of artificial intelligence model, generating layers at corresponding locations among layers included in each of the plurality of artificial intelligence models.

The reference value may be determined based on an average value and a distribution value of the layer parameters with respect to the layers at corresponding locations.

Based on the distribution value of the plurality of layer parameters being less than or equal to a predetermined value, the reference value may be determined based on the average value of the plurality of layer parameters.

The method may further comprise, based on the distribution value of the plurality of layer parameters being greater than or equal to the predetermined value, identifying a distribution of the plurality of layer parameters, and based on the distribution satisfying a predetermined condition, obtaining a reference value based on the distribution value of the plurality of layer parameters.

The method may further comprise, based on the distribution not satisfying the predetermined condition, obtaining a reference value based on the average value of the plurality layer parameters, and the distribution value of the plurality of layer parameters.

The generating may further comprise identifying the number of artificial intelligence model generated based on a memory capacity of the electronic apparatus.

The method may further comprise, based on input value being input to the generated artificial intelligence model, outputting a result value by ensembling the plurality of layers.

According to another embodiment of the disclosure, an electronic apparatus for generating an artificial intelligence model, the apparatus includes a communicator, a memory, and a processor configured to receive a reference value for obtaining a layer parameter with respect to layers at corresponding locations from an external server, among a plurality of layers included in each of a plurality of artificial intelligence models, through the communicator, the processor is configured to, based on a user command for using a plurality of artificial intelligence models being input, generate the plurality of artificial intelligence models, and input input data to the generated artificial intelligence model to obtain output data with respect to the input data, and based on a reference value for obtaining a layer parameter with respect to layers at corresponding locations among a plurality of layers included in each of the plurality of artificial intelligence model, generate layers at corresponding locations among layers included in each of the plurality of artificial intelligence models.

The reference value may be determined based on an average value and a distribution value of the layer parameters with respect to the layers at corresponding locations.

The processor may be configured to, based on the distribution value of the plurality of layer parameters being less than or equal to a predetermined value, wherein the reference value is determined based on the average value of the plurality of layer parameters.

The processor may be configured to, based on the distribution value of the plurality of layer parameters being greater than or equal to the predetermined value, identify a distribution of the plurality of layer parameters, and based on the distribution satisfying a predetermined condition, obtain a reference value based on the distribution value of the plurality of layer parameters.

The processor may be configured to, based on the distribution not satisfying the predetermined condition, obtain a reference value based on the average value of the plurality layer parameters, and the distribution value of the plurality of layer parameters.

The processor may be configured to identify the number of artificial intelligence model generated based on a memory capacity of the electronic apparatus.

The processor may be configured to, based on input value being input to the generated artificial intelligence model, output a result value by ensembling the plurality of layers.

According to another embodiment of the disclosure, a method of controlling a server, the method includes obtaining a plurality layer parameters with respect to layers at corresponding locations among a plurality of layers included in each of a plurality of artificial intelligence models, based on the obtained plurality of layer parameters, obtaining a reference value for generating a layer parameter with respect to a new layer at the corresponding location, and transmitting the obtained reference value to a user terminal.

The reference value may be determined based on an average value and a distribution value of the layer parameters with respect to the layers at corresponding locations.

Based on the distribution value of the plurality of layer parameters being less than or equal to a predetermined value, the reference value may be determined based on the average value of the plurality of layer parameters.

The method may further comprise, based on the distribution value of the plurality of layer parameters being greater than or equal to the predetermined value, identifying a distribution of the plurality of layer parameters, and based on the distribution satisfying a predetermined condition, obtaining a reference value based on the distribution value of the plurality of layer parameters.

The method may further comprise, based on the distribution not satisfying the predetermined condition, obtaining a reference value based on the average value of the plurality layer parameters, and the distribution value of the plurality of layer parameters.

Effect of the Invention

According to various embodiments of the disclosure as described above, the electronic apparatus may efficiently use the artificial intelligence model even in a limited storage space.

BEST MODE FOR IMPLEMENTING THE DISCLOSURE

Figure 1A:
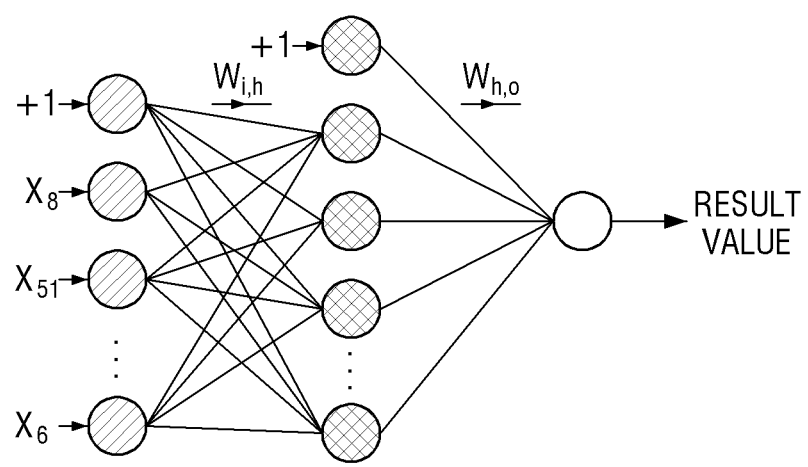
FIGS. 1A to 1C are views illustrating a method of outputting a result of an artificial intelligence model operating in a conventional server according to an embodiment of the disclosure.

The terms used in example embodiments will be briefly explained, and example embodiments will be described in greater detail with reference to the accompanying drawings.

Terms used in the disclosure are selected as general terminologies currently widely used in consideration of the configuration and functions of the disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the disclosure.

The example embodiments may vary, and may be provided in different example embodiments. Various example embodiments will be described with reference to accompanying drawings. However, this is not intended to limit the scope to an exemplary embodiment, and therefore, it should be understood that all the modifications, equivalents or substitutes included under the invented spirit and technical scope are encompassed. While describing exemplary embodiments, if it is determined that the specific description regarding a known technology obscures the gist of the disclosure, the specific description is omitted.

The terms such as "first," "second," and so on may be used to describe a variety of elements, but the elements should not be limited by these terms. The terms used herein are solely intended to explain specific example embodiments, and not to limit the scope of the disclosure.

Singular forms are intended to include plural forms unless the context clearly indicates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In the disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in a specific hardware.

In the disclosure, an ensemble model may refer to a model that calculates and uses outputs of at least two artificial intelligence models. In this case, a combination of a plurality of models may be referred to as an ensemble. Each artificial intelligence model constituting the ensemble model may be referred to as an individual model or an artificial intelligence model. The ensemble model may output a final output value by applying averaging, weight sum, and boosting methods to output values of each artificial intelligence model.

In the disclosure, a layer may refer to one layer in a multilayer neural network structure. In other words, one layer may be defined as a layer in a plurality of ensemble models. In general, a layer may be defined in a form of $y=f(Wx+b)$ with respect to an input vector x and an output vector y. In this case, W and b may be referred to as layer parameters.

In the disclosure, when an output of two or more layers is combined and used in a plurality of artificial intelligence models, an ensembled layer may refer to a layer in which the outputs are combined.

In the disclosure, a layer structure (Layer Scheme or Neural Network Scheme) may refer to a structure of an artificial intelligence model, such as ensemble model, the number of individual models in the ensemble model, connectivity between layers, or the like.

In the disclosure, a layer function may indicate that the definition of the layer ($y=f(Wx+b)$) is generalized and expressed as an arbitrary function of g. For example, the layer function may be expressed as $y=g(x)$ or $y\_j = g(x1, x2, \ldots x\_N)$. In this case, the layer function g is expressed as a linear function of inputs $x1, \ldots, x\_N$, but may be expressed in other forms.

In the disclosure, a stochastic layer function may refer to a function in which an output of a layer function is probabilistically determined. For example, the probabilistic layer function may be composed of a probability distribution of output $y\_j$ with respect to $x\_1, \ldots x\_N$, such as $y\_j \sim (f\_mean(x\_1 \ldots x\_N), f\_var(x\_1 \ldots X\_N)$.

The embodiments of the disclosure will be described in greater detail below in a manner that will be understood by one of ordinary skill in the art. However, embodiments may be realized in a variety of different configurations, and not limited to descriptions provided herein. Also, well-known functions or constructions are not described in detail since they would obscure the invention with unnecessary detail, and similar drawing symbols are attached to similar parts throughout the specification.

Figure 1B:
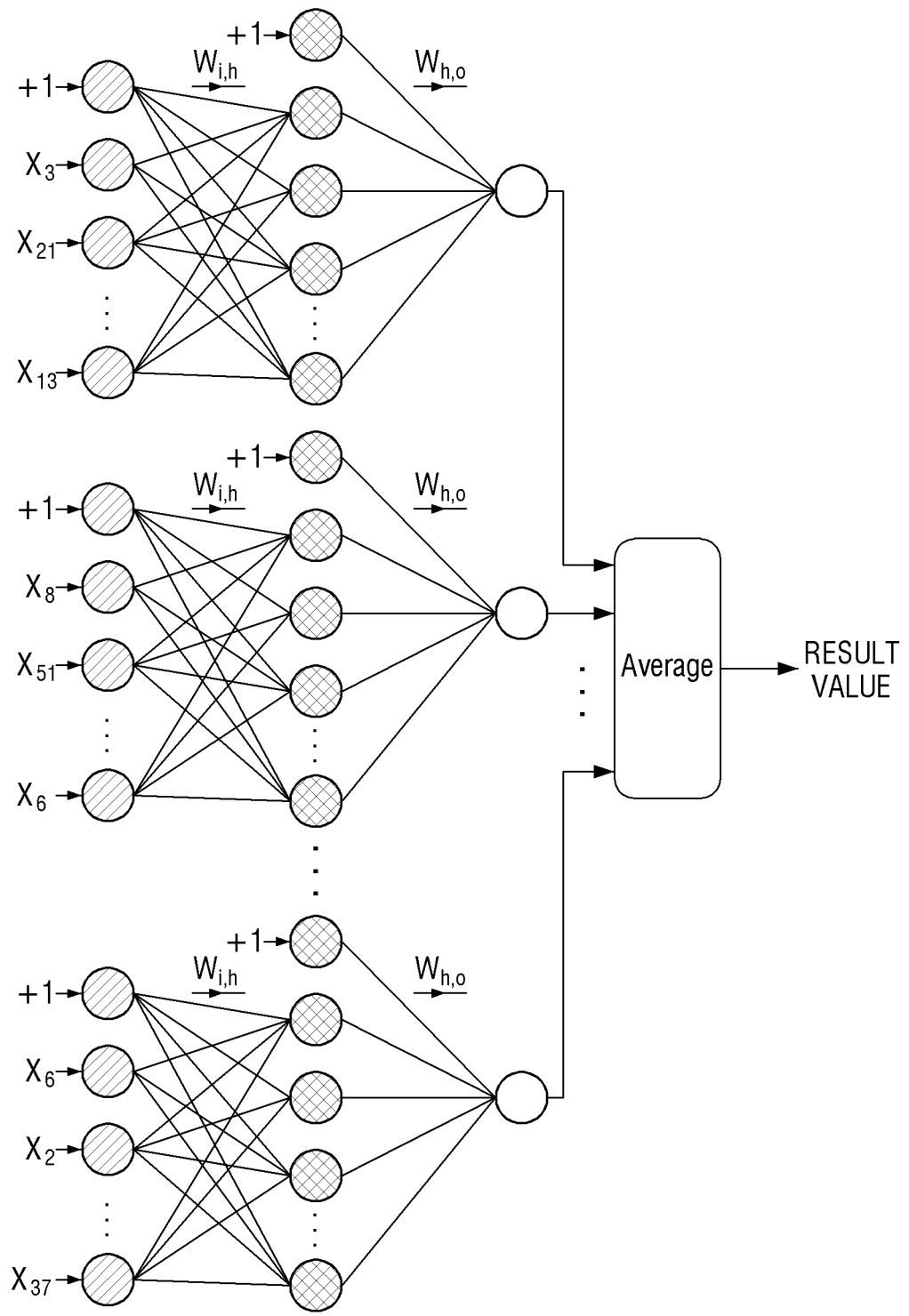
Figure 1C:
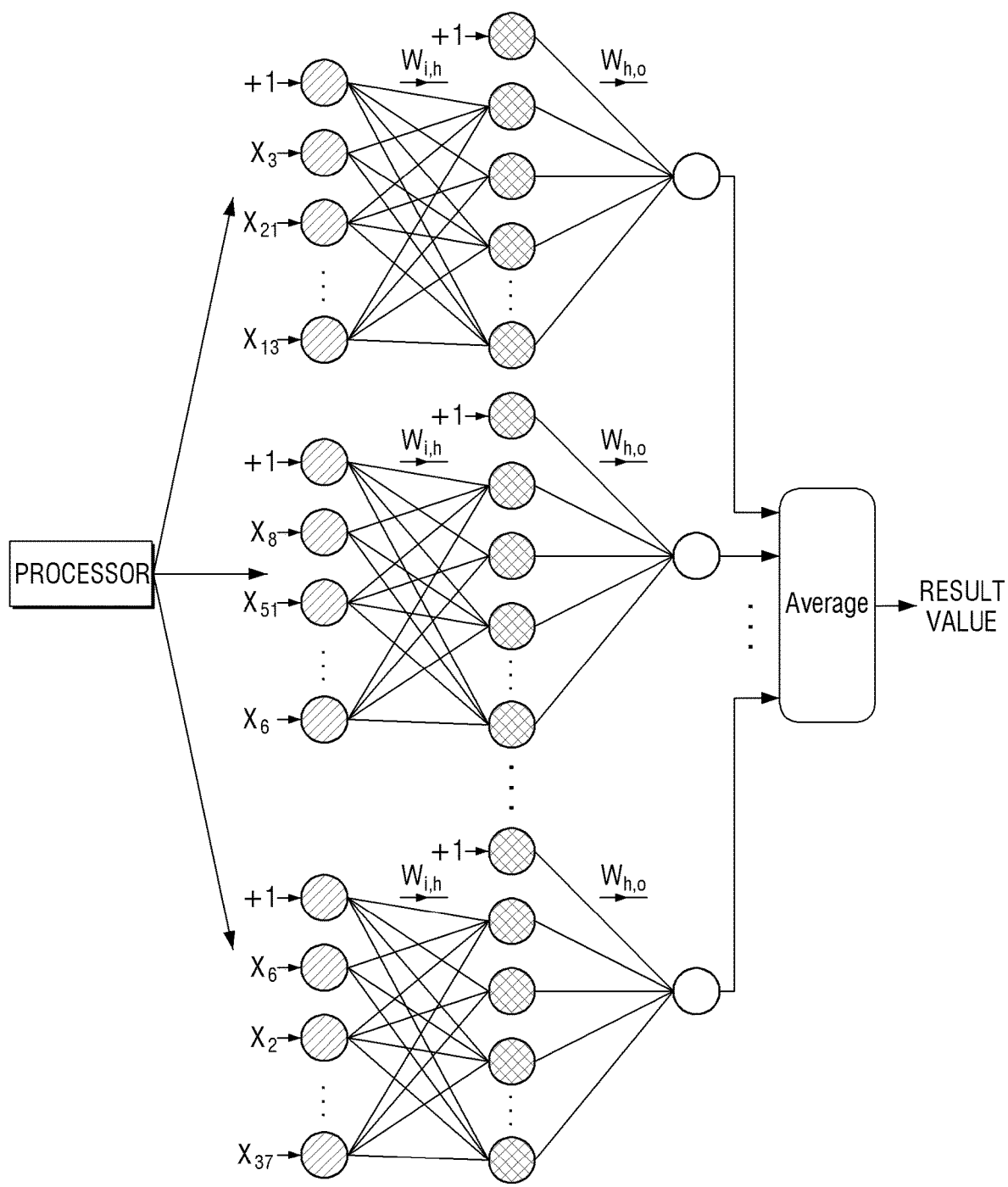

FIGS. 1A to 1C are views illustrating a method of outputting a result of an artificial intelligence model operating in a conventional server according to an embodiment of the disclosure.

As illustrated in FIG. 1A, a conventional server may have a method of inputting data into one artificial intelligence model and outputting a result value. Specifically, the conventional server may train one artificial intelligence model, input data into the trained model, and output a result value. However, when the conventional server uses one single model, a recognition result may be easily changed even with small noise, and thus an accuracy and a stability of the result value are low.

In order to improve the accuracy and stability of the artificial intelligence model, the conventional server may ensemble a plurality of models and output a result value as illustrated in FIG. 1B. Specifically, the ensemble model may output a plurality of result values by inputting data to a plurality of models separately trained, and output a final result based on the output plurality of result values. In this case, the final result may be output by applying the averaging, weight sum, boosting methods, etc. to the plurality of result values.

For example, the ensemble model may determine an average value of the result values output through each artificial intelligence model as a final output value.

Alternatively, the ensemble model may output a final output value obtained by multiplying a specific output value by a specific weight value among result values output through each artificial intelligence model.

Alternatively, when each result value output through each artificial intelligence model includes a plurality of parameters, the ensemble model may determine a final output parameter with respect to each of the plurality of parameters. For example, it may be assumed that the ensemble model includes three artificial intelligence models, and the result value output through the three artificial intelligence models includes five parameters. In this case, a first model may output a first result value including a first parameter to a fifth parameter, a second model may output a second result value including the first parameter to the fifth parameter, and a third model may output a third result value including the first parameter to the fifth parameter. In this case, the ensemble model may obtain the first parameter of a final output value based on the first parameter of the first model, the first parameter of the second model, and the first parameter of the third model, and may obtain the second parameter of the final output value based on the second parameter of the first model, the second parameter of the second model, and the second parameter of the third model. In the same way, when the third to fifth parameters of the final output value are determined, the ensemble model may obtain the determined first to fifth parameters as the final output value.

When using the ensemble model, it may have better stability and higher accuracy than when using one single model, there is less overfitting problem in a training process, and may have strong stability against external adversarial attacks.

However, as the number of ensembled models increases, the number of layer parameters used in the model and the amount of calculation may increase. In addition, even if a plurality of models are trained separately, since the ensemble model is a model trained to achieve one goal (e.g., voice recognition, face recognition, etc.), training results of the plurality of separately trained models may be similar, so that it is often not guaranteed to improve performance dramatically.

Therefore, in the case of using the ensemble model, since a large storage space and a large number of calculation processes are required compared to the expected performance improvement, there is an inadequate aspect of using an ensemble model for devices with relatively small storage space and processing speed such as smartphones, display devices, and IoT systems.

Accordingly, in order to stably use the artificial intelligence model in a device such as a user terminal (hereinafter, referred to as an electronic apparatus), a small storage space and a small amount of calculation must be secured while using the ensemble model.

Therefore, as described below, instead of receiving and storing a plurality of models from the server 100, the electronic apparatus 200 may receive and store a layer generator capable of generating a plurality of models, and generate an ensemble model through a processor to generate capable of maintaining similar performance in a small storage space. In other words, as illustrated in FIG. 1C, the electronic apparatus 200 may not store a plurality of layers, and receive a reference value for generating a layer parameter, data for a specific condition, and a layer parameter generation function from the server 100, and may generate layer parameters, if necessary. In order to generate a layer from the generated layer parameter, the electronic apparatus 200 may receive data on the layer structure from the server 100.

Meanwhile, the ensemble model according to the disclosure may be used in various fields. As an embodiment, the ensemble model generated in the electronic apparatus 200 may be an ensemble model for speech recognition. A general speech recognition artificial intelligence model has a large capacity and may be used in a server. However, when voice recognition is performed in the server, data use may be continuously used and or personal information leakage may occur. According to the disclosure, when the electronic apparatus 200 generates an ensemble model for speech recognition, it is possible to perform speech recognition through the ensemble model simply by receiving data for generating the ensemble model from the server 100.

As another embodiment, the ensemble model generated in the electronic apparatus 200 may be an ensemble model for language translation. When language translation is performed in the electronic apparatus 200 separately from the server 100, there is an advantage that a translation function may be used even in an offline.

As another embodiment, the ensemble model generated in the electronic apparatus 200 may refer to an ensemble model for image recognition and processing. A capacity of the artificial intelligence model for general image recognition/processing is large so that it is used in servers, and when an input image is a high-definition image, it may take a lot of time and cost to be transmitted to the server. In addition, since images such as personal photos have security issues, they may not be suitable to be transmitted to the server. According to the disclosure, when the electronic apparatus 200 generates an ensemble model for image recognition/processing, image recognition/processing may be performed through the ensemble model by simply receiving data for generating the ensemble model from the server 100.

Figure 2:
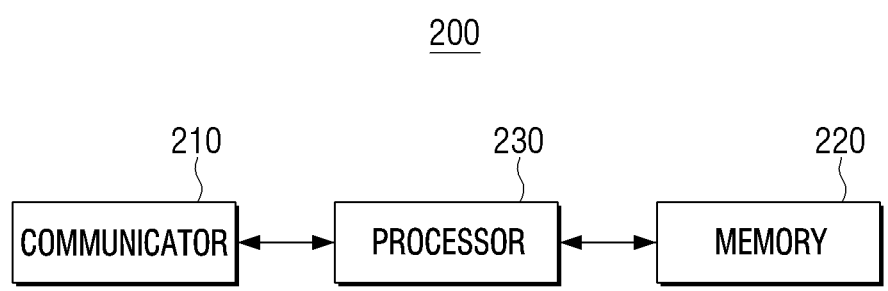
FIG. 2 is a block diagram schematically illustrating a configuration of an electronic apparatus according to an embodiment of the disclosure.

FIG. 2 is a block diagram schematically illustrating a configuration of an electronic apparatus according to an embodiment of the disclosure.

As illustrated in FIG. 2, the electronic apparatus 200 may include a communicator 210, a memory 220, and a processor 230. The electronic apparatus 200 according to various embodiments may include at least one of, for example, smartphone, tablet PC, mobile phone, video phone, e-book reader, desktop PC, laptop PC, netbook computer, workstation, server, PDA, portable multimedia player (PMP), MP3 player, medical device, camera, or a wearable device. Wearable devices may include at least one of accessories (e.g. watches, rings, bracelets, anklets, necklaces, glasses, contact lenses, or head-mounted-devices (HMD)), fabrics or clothing (e.g. electronic clothing), a body attachment type (e.g., a skin pad or a tattoo), or a bio-implantable circuit.

The communicator 210 performs communication between the external device 200 and a display device. In this case, the communication connection between the communicator 210 and the external device may include communicating through a third device (e.g., a repeater, a hub, an access point, a server, a gateway, or the like).

The wireless communication, for example, may include a cellular communication using at least one among long-term evolution (LTE), LTE Advance (LTE-A), code division multiple access (CDMA), wideband CDMA (WCDMA), universal mobile telecommunications system (UMTS), Wireless Broadband (WiBro), and Global System for Mobile Communications (GSM). According to an exemplary embodiment, wireless communication may include at least one of, for example, wireless fidelity (WiFi), Bluetooth, Bluetooth Low Energy (BLE), Zigbee, near field communication (NFC), Magnetic Secure Transmission, radio frequency RF, or body area network BAN. Wired communication may include at least one of, for example, universal serial bus (USB), high definition multimedia interface (HDMI), recommended standard232 (RS-232), power line communication, or plain old telephone service (POTS).

The network in which wireless communication or wired communication is performed may include at least one of telecommunication networks, such as a computer network (e.g., LAN or WAN), the Internet, or a telephone network.

The memory 220, for example, may store a command or data regarding at least one of the other elements of the electronic apparatus 200. According to an embodiment, the memory 220 may store software and/or a program 140. For example, the programs may include a kernel, a middleware, an application programming interface (API) and/or an application program (or "application"), etc. At least part of the kernel, middleware, or API may be referred to as an operating system. The kernel, for example, may control or manage system resources used to execute operations or functions implemented in other programs. In addition, the kernel 141 may provide an interface to control or manage the system resources by accessing individual elements of the electronic apparatus 200 in the middleware, the API or the application program.

The middleware, for example, may play an intermediary role so that an API or an application program communicates with the kernel to exchange data. In addition, the middleware may process one or more job requests received from the application program based on priorities. For example, the middleware may prioritize using system resources of the electronic apparatus 200 among application programs, and may process the one or more job requests. The API is an interface through which the application controls the function that is provided from the kernel or the middleware, and may include, for example, at least one interface or function (e.g., command) for file control, window control, image processing, or text control.

Meanwhile, the memory 220 may include various modules for generating a layer according to the disclosure. In one embodiment, the memory 220 may include various modules such as a layer parameter generating module for generating a layer parameter, a layer function generating module for generating a layer function, a layer structure changing module for changing the structure of a layer, and a probabilistic ensemble generation module for controlling to be changed according to a specific probability distribution value. The various modules described above may be controlled by a processor to generate a layer parameter, a layer function, a layer structure, or the like.

The processor 230 may include one or more of a central processing unit (CPU), application processor (AP) and communication processor (CP).

For example, the processor 230 may be at least one of an application-specific integrated circuit (ASIC), an embedded processor, a microprocessor, hardware control logic, hardware finite state machine (FSM), and a digital signal processor (DSP). Although not illustrated, the processor 230 may further include an interface such as a bus for communication with each component.

The processor 230 may, for example, control a number of hardware or software elements connected to the processor 230 by driving an operating system or application program, and perform various data processing and calculations. The processor 230, for example, may be realized as a system on chip (SoC). According to an embodiment, the processor 230 may further include a graphic processing unit (GPU) and/or an image signal processor. The processor 230 may load and process a command or data received from at least one of other elements (e.g., nonvolatile memory, such as a non-transitory computer readable storage) to a volatile memory, and store result data in the nonvolatile memory.

Meanwhile, the processor 230 may include a dedicated processor for artificial intelligence (AI), or may be manufactured as a part of an existing general-purpose processor (e.g., CPU or application processor) or a dedicated processor for graphics (e.g., GPU). In this case, the dedicated processor for artificial intelligence is a dedicated processor specialized in probability calculation, and has higher parallel processing performance than conventional general-purpose processors, so it may quickly process calculation tasks in artificial intelligence fields such as machine learning.

The processor 230 may receive a reference value for obtaining a layer parameter with respect to a layer at a corresponding location among a plurality of layers included in each of the plurality of artificial intelligence models through the communicator 210 from an external server. In this case, the reference value is generated by an external server and is a value for generating a layer parameter. For example, the reference value may be at least one of an average value or a variance value of layer parameters with respect to layers at corresponding locations of the ensemble model.

When a user command for using a plurality of artificial intelligence models is input, the processor 230 may generate an ensemble model (or a plurality of artificial intelligence models) based on a reference value received from an external server. When input data is input to the generated ensemble model, the processor 230 may obtain output data for the input data.

Specifically, the processor 230 may generate a layer at a corresponding location among layers included in each of the plurality of artificial intelligence models among a plurality of layers included in each of the plurality of artificial intelligence models included in the ensemble model, based on a reference value for acquiring a layer parameter with respect to layers at corresponding locations.

In this case, the reference value may be an average value or a variance value of layer parameters with respect to layers at corresponding locations. The reference value may be variously determined according to various conditions. In an embodiment, when the variance value of the plurality of layer parameters is less than or equal to a predetermined value, the reference value may be determined based on an average value of the plurality of layer parameters. In another embodiment, when the reference value is equal to or greater than the predetermined value, and a variance of the plurality of layer parameters satisfies a predetermined condition, the reference value may be determined based on the variance value of the plurality of layer parameters. In another embodiment, when the variance value of the plurality of layer parameters is equal to or greater than the predetermined value, and the distribution of the plurality of layer parameters does not satisfy the predetermined condition, the reference value may be determined based on the average value and the variance value of the plurality of layer parameters.

When the reference value is determined based on the average value of the plurality of layer parameters, the processor 230 may generate a layer parameter based on the reference value determined based on the average value of the plurality of layer parameters. For example, the generated layer parameter may refer to an arbitrary output value obtained by putting the reference value determined based on the average value of the plurality of layer parameters into a function having a Gaussian distribution as an input value. In this case, the generated layer parameters W' may be referred to as, for example, $W'=\{w_{-ij} \sim N(m, v)\}_{-ij}$.

As another example, the generated layer parameter may be determined according to the reference value determined based on the average value of the plurality of layer parameters and a distribution with respect to transformation of layers. In this case, the generated layer parameter W' may be a calculation value with respect to an arbitrary function A(t). In other words, it may be formed as $W'=A(t)*W$.

Meanwhile, when the reference value is determined based on the variance values of the plurality of layer parameters, the processor 230 may generate the layer parameter based on the reference value determined based on the variance values of the plurality of layer parameters.

Meanwhile, when the reference value is determined based on the average value and the variance value of the plurality of layer parameters, the processor 230 may generate the layer parameter based on the reference value determined based on the average value and the variance value of the plurality of layer parameters.

For example, when the reference value is determined based on the average value and the variance value of the plurality of layer parameters, the processor 230 may generate the output value of a probabilistic layer function (e.g. $y\_j \sim N(f\_mean(x\_1 \ldots x\_N), f\_var(x\_1 \ldots X\_N))$) as a layer parameter.

According to the method described above, the processor 230 may generate layer parameters of all layers included in the ensemble model. In other words, since the processor 230 generate a layer parameter with only the reference value received from the server 100 and information on a method of generating the layer parameter, it is not necessary to store all the layer parameters included in the ensemble model, thereby reducing storage space and the amount of calculating.

Meanwhile, the processor 230 may determine the number of artificial intelligence models generated based on the memory capacity of the electronic apparatus. In other words, the processor 230 may identify the space of the memory 220 and determine the number of artificial intelligence models required for the ensemble model according to the identified space of the memory 220. When the amount of memory 220 is sufficient, the processor 230 may generate a large number of artificial intelligence models to increase accuracy and stability, and when the space of the memory 220 is insufficient, the processor may generate the artificial intelligence model to be adapted to the space of the memory 220 and output results quickly.

When an input value is input to the generated ensemble model, the processor 230 may output a result value.

Figure 3:
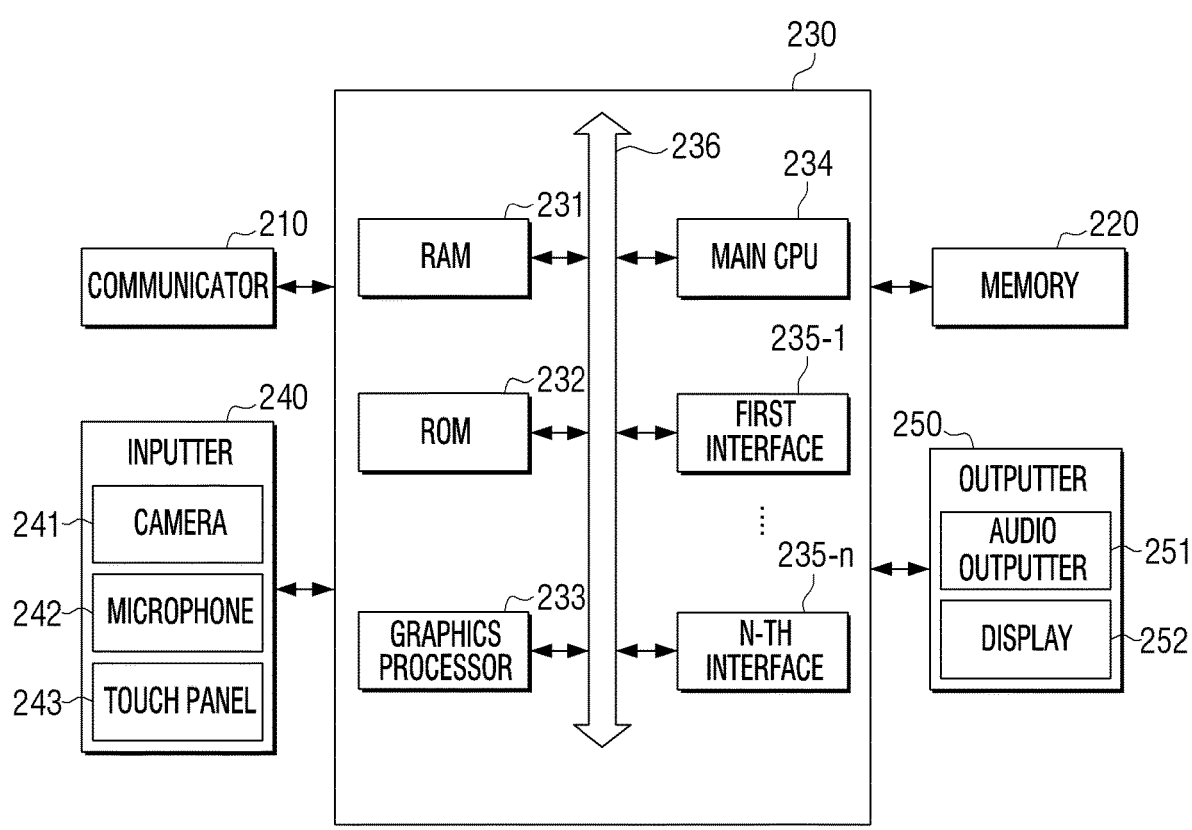
FIG. 3 is a block diagram illustrating a detailed configuration of an electronic apparatus 200 according to an embodiment of the disclosure.

FIG. 3 is a block diagram illustrating a detailed configuration of an electronic apparatus 200 according to an embodiment of the disclosure.

The electronic apparatus 200 may further include an inputter 240 and an outputter 250, in addition to the communicator 210, the memory 220, and the processor 230. However, the structure of the electronic apparatus 100 is not limited to the above example, and components may be added, or omitted.

The communicator 210 may communicate with an external apparatus. The communicator 210 may include various communication chips such as a Wi-Fi chip, a Bluetooth chip, a Near Field Communication (NFC) chip, a wireless communication chip, and so on. In this case, the Wi-Fi chip, the Bluetooth chip and the NFC chip perform communication according to a LAN method, a Wi-Fi method, a Bluetooth method, and an NFC method, respectively. When the WI-FI chip or the Bluetooth chip is used, various connection information such as SSID and session key may be first exchanged, communication may be connected by using the connection information, and various information may be exchanged. The wireless communication chip may mean a chip or integrated circuit that performs communication according to various communication standards and protocols, such as the IEEE, ZigBee, third generation (3G), 3rd Generation Partnership Project (3GPP), Long Term Evolution (LTE), or the like.

The memory 220 may include at least one of an internal memory and an external memory. The internal memory may include at least one of volatile memory (e.g., DRAM, SRAM, or SDRAM), non-volatile memory (e.g., one-time programmable ROM (OTPROM), PROM, EPROM, EEPROM, mask ROM, flash ROM, flash memory, a hard drive, or a solid-state drive (SSD). The external memory 234 may include a flash drive, for example, a compact flash (CF), a secure digital (SD), Micro-SD, Mini-SD, an extreme digital (XD), a multi-media card (MMC) or a memory stick and the like, such as a non-transitory computer readable storage. The external memory may be connected functionally or physically to the electronic apparatus 200 through a variety of interfaces.

The inputter 240 receives a user command. The electronic apparatus 10 may include a camera 241, a microphone 242, and a touch panel 243.

The camera 241 is a component for acquiring image data around the electronic apparatus 200. The camera 241 may photograph a still image and a video. For example, the camera 241 may include one or more image sensors (e.g., a front sensor or a rear sensor), a lens, an image signal processor (ISP), or a flash (e.g., an LED or xenon lamp). The microphone 242 may obtain a sound around the electronic apparatus 200. The microphone 242 may receive an external sound signal and generate electrical sound information. The microphone 242 may use various noise removal algorithms to remove noise generated in the process of receiving the external sound signal. Image information or sound information input through the camera 241 or the microphone 242 may be input as an input value of the artificial intelligence model.

The touch panel 243 may receive various user inputs. The touch panel 243 may receive data by user manipulation. The touch panel 243 may be configured in combination with a display to be described below.

The inputter 240 may have various configurations for receiving various data in addition to the camera 241, the microphone 242, and the touch panel 243 described above.

The outputter 250 may include an audio outputter 251 or a display 252, and may output various data.

The audio outputter 251 may be an element to output various sounds with respect to an input data. The audio outputter 251 may include various audio output circuitry and is configured to output various kinds of alarm sounds or voice messages in addition to various audio data on which various processing operations such as decoding, amplification, and noise filtering are performed by an audio processor (not illustrated). Specifically, the audio outputter 251 may be implemented to be speaker; this is merely one of various embodiments of the disclosure. The audio outputter 170 may be implemented to be output component that can output the audio data.

The display 252 is a component for outputting various images of input data. The display 252 may be implemented as a display panel of various shapes. For example, the display panel may be implemented with various display technologies such as liquid crystal display (LCD), organic light emitting diode (OLED), active-matrix organic light-emitting diode (AM-OLED), liquid crystal on silicon (LcoS), or digital light processing (DLP). The display 252 may be implemented in a form of a flexible display form and may be connected to at least one of a front area, a side area, and a rear area of the electronic apparatus 100.

Hereinafter, the operation of the electronic apparatus will be described in detail with reference to FIGS. 4A to 6E.

Figure 4A:
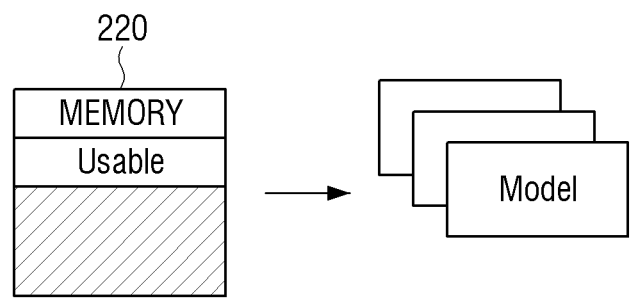
FIGS. 4A and 4B are views illustrating a method of generating an artificial intelligence model according to a memory storage space according to an embodiment of the disclosure.
Figure 4B:
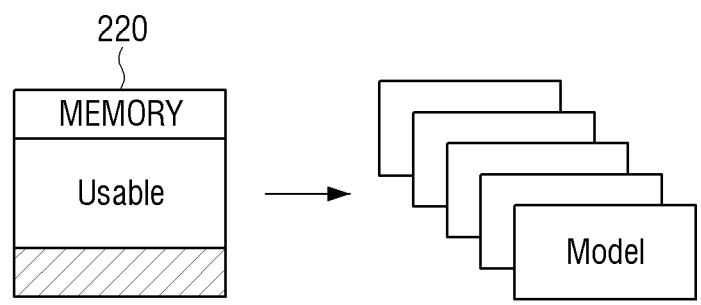

FIGS. 4A and 4B are views illustrating a method of generating an artificial intelligence model according to a memory storage space according to an embodiment of the disclosure.

As illustrated in FIGS. 4A and 4B, the electronic apparatus 200 may change the number of artificial intelligence models to be used depending on a storage space of the memory 220. Specifically, when a user command for using the artificial intelligence model is input, the electronic apparatus 220 may identify the storage space of the memory 220 and determine the number of artificial intelligence models to be ensembled depending on the identified storage space. Specifically, as shown in FIG. 4A, when an available storage space of the memory 220 is insufficient, the electronic apparatus 220 may generate a small number of artificial intelligence models depending on the available storage space. Alternatively, as illustrated in FIG. 4B, when the memory 220 has sufficient available storage space, the electronic apparatus 220 may generate a large number of artificial intelligence models depending on the available storage space.

For example, when a usable memory space is smaller than a size of the ensemble model, the electronic apparatus 200 may produce an ensemble model suitable for the memory space by removing some of the plurality of artificial intelligence models included in the ensemble model.

When the usable memory space is larger than the size of the ensemble model, the electronic apparatus 200 may use the ensemble model as it is.

Alternatively, when the usable memory space is larger than the size of the ensemble model, the electronic apparatus 200 may produce not only the plurality of artificial intelligence models included in the existing ensemble model, but also additional artificial intelligence model based on the usable memory space to improve performance, and ensemble the plurality of artificial intelligence models included in the existing ensemble model with additional artificial intelligence models.

Figure 5A:
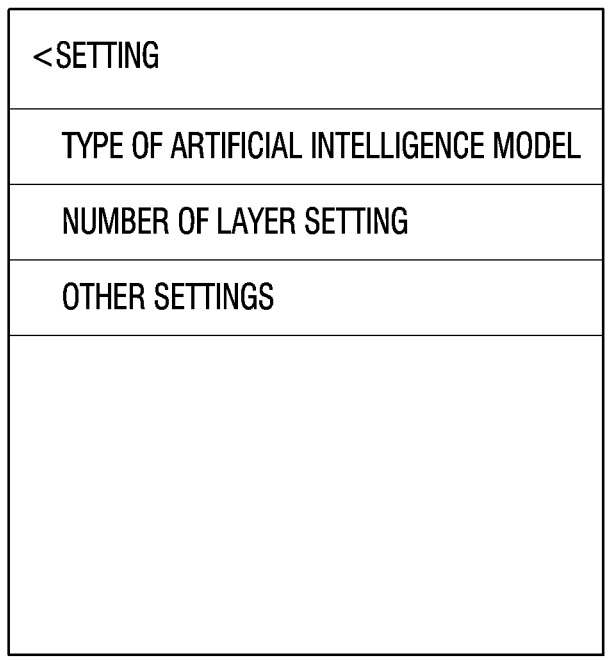
FIGS. 5A to 5C are views illustrating a UI capable of adjusting an artificial intelligence model generated according to a user command according to an embodiment of the disclosure.
Figure 5B:
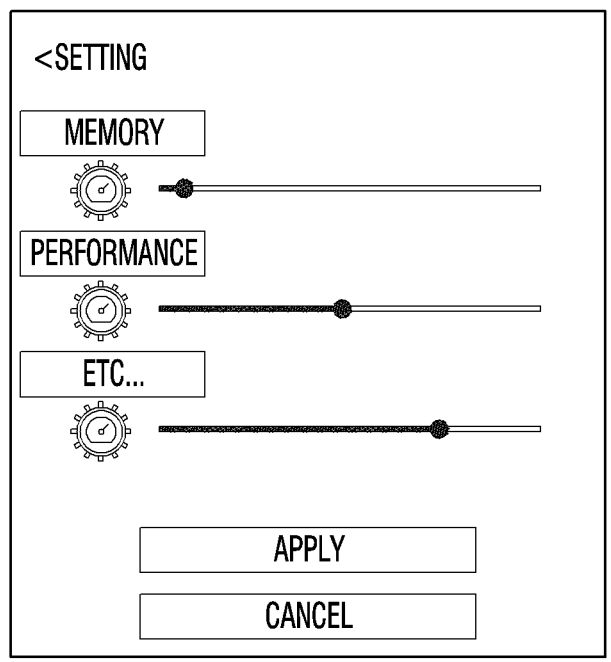
Figure 5C:
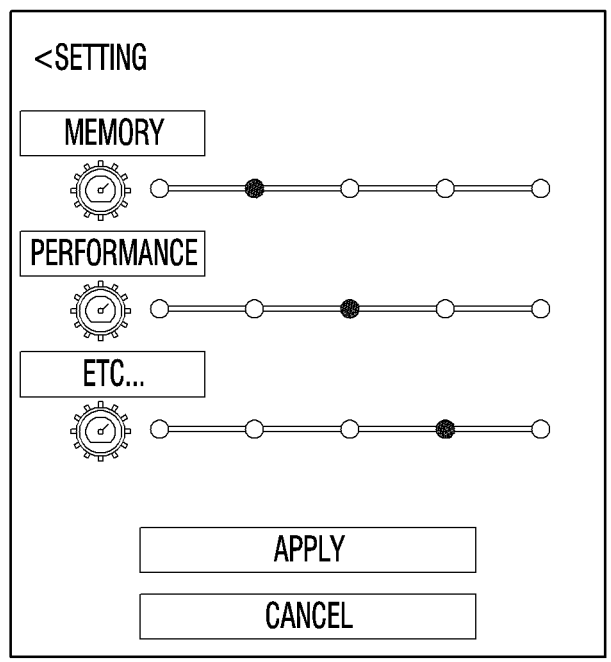

FIGS. 5A to 5C are views illustrating a UI capable of adjusting an artificial intelligence model generated according to a user command according to an embodiment of the disclosure;

Specifically, as illustrated in FIG. 5A, the electronic apparatus 200 may adjust a type of artificial intelligence model and the number of ensembled layers depending on a user selection. In this case, the type of the artificial intelligence model may be a type of an artificial intelligence model for voice recognition, an artificial intelligence model for image analysis, or the like.

Meanwhile, as illustrated in FIG. 5B, the electronic apparatus 200 may provide a UI capable of ensemble an artificial intelligence model optimized for a user in consideration of the memory 220, and performance, etc. of the electronic apparatus 200. In other words, as illustrated in FIG. 5B, the electronic apparatus 200 may display a bar UI for manipulating the size of the memory to be used and a desired performance in the artificial intelligence model. However, the shape of the bar UI is not limited to the example illustrated in FIG. 5B, and may be displayed in the form of a UI that can be set for each level as illustrated in FIG. 5C. In other words, as illustrated in FIG. 5C, the user may select one of the five levels (discontinuously) with respect to indicators such as memory and performance.

Meanwhile, although not disclosed in FIGS. 5A to 5C, the electronic apparatus 200 may display a UI that can directly designate the number of layers required for the ensemble model, the type of artificial intelligence model to be used, or the like.

The settings related to the generation of the ensemble model described above may be changed in various ways. In an embodiment, when the artificial intelligence service operates in a specific application, the electronic apparatus 200 may change an ensemble model setting environment by changing an internal setting of a specific application. In another embodiment, the electronic apparatus 200 may change the ensemble model setting environment in the setting environment of the electronic apparatus 200 itself (e.g., an OS setting environment).

FIGS. 6A to 6E are views illustrating a method of ensembled layers according to an embodiment of the disclosure.

As described above, the electronic apparatus 200 may not only generate a layer parameter based on a reference value, but may further generate a layer scheme. In other words, the electronic apparatus 200 may receive a layer structure from the server 100 and store it in the memory 220, but if necessary, the layer structure may be changed and used as illustrated in FIGS. 6A to 6E. FIGS. 6A to 6E describe for a case in which three artificial intelligence models are ensembled, but three or more models may be ensembled or two models may be ensembled.

Figure 6A:
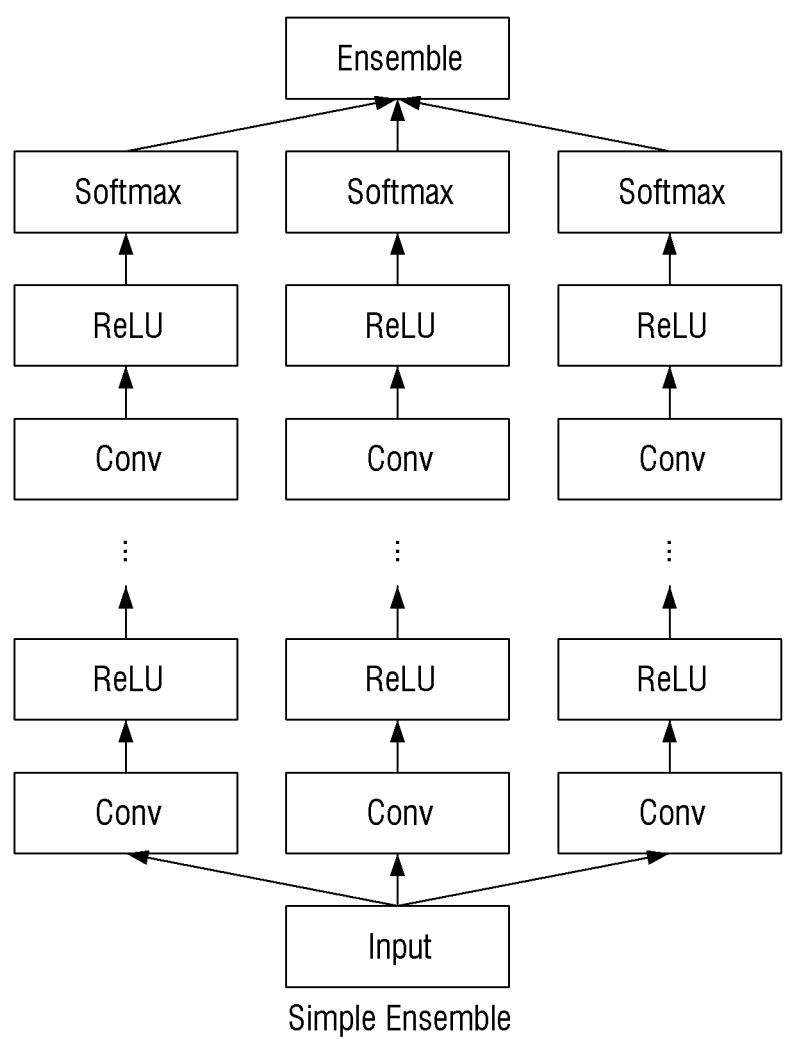
FIGS. 6A to 6E are views illustrating a method of ensembled layers according to an exemplary embodiment of the disclosure.
Figure 6B:
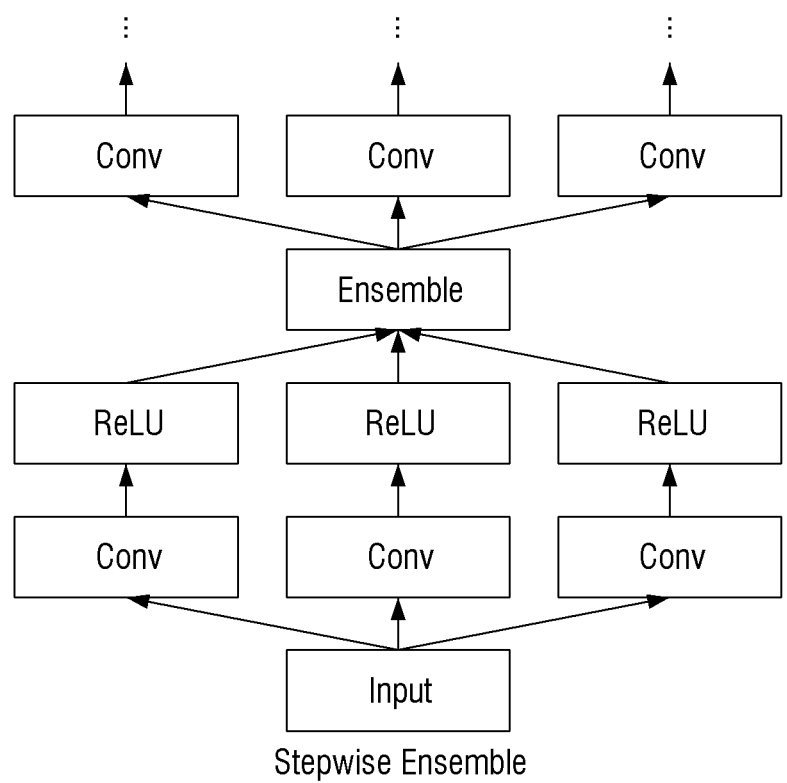
Figure 6C:
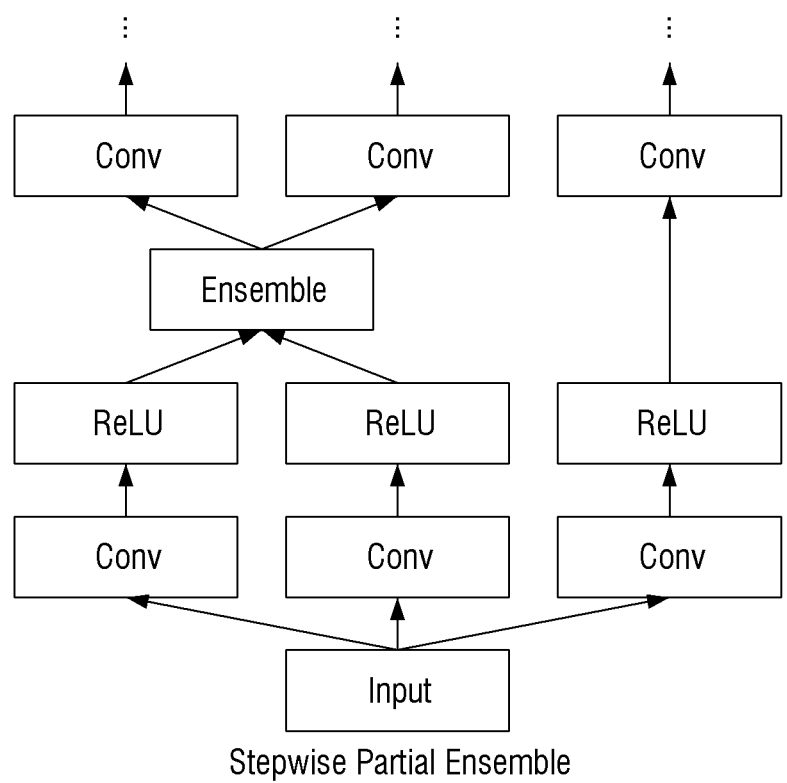
Figure 6D:
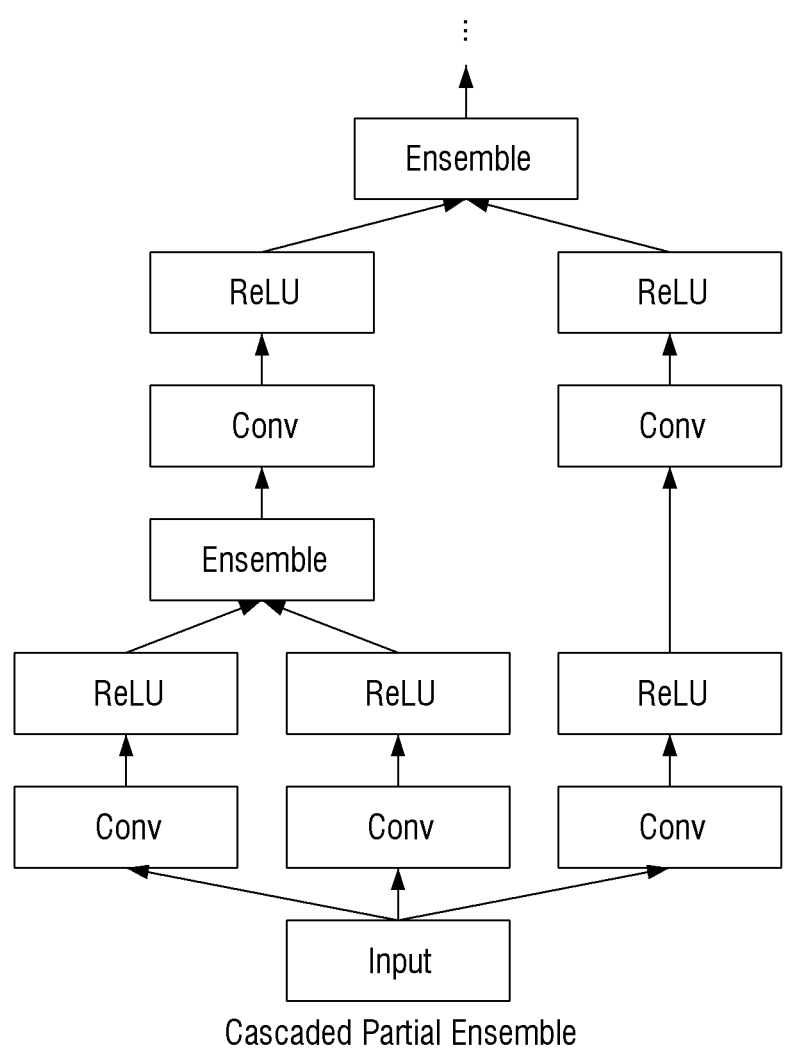
Figure 6E:
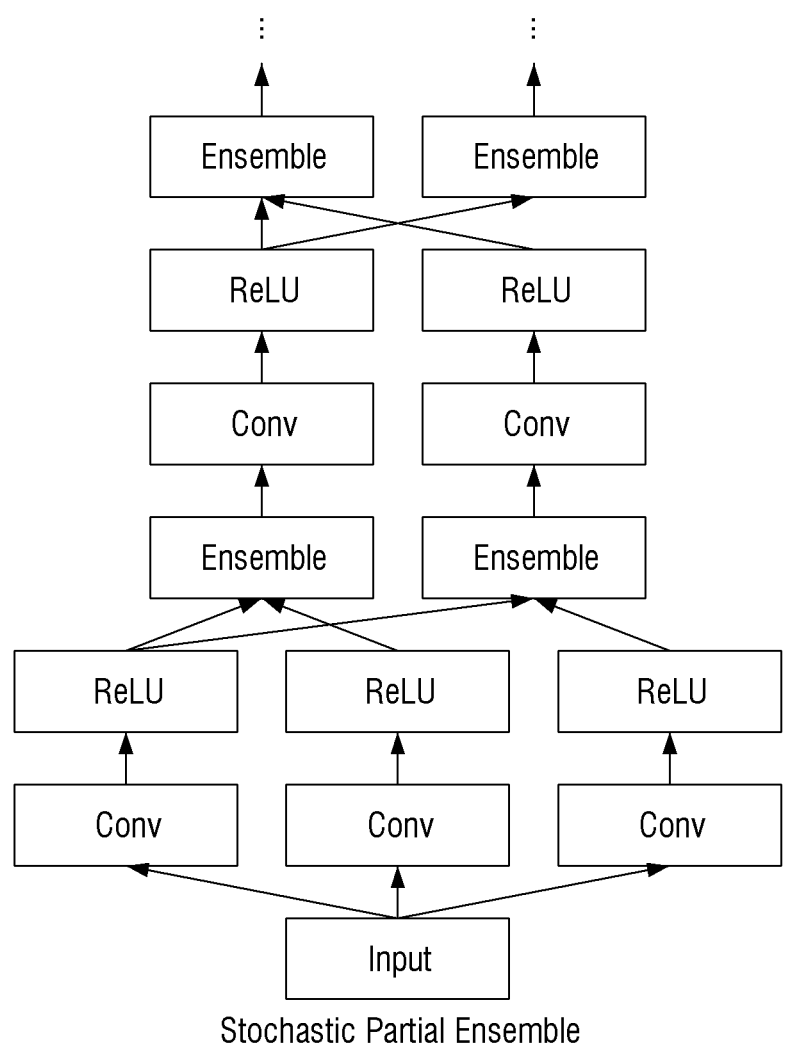

FIG. 6A illustrates a layer structure according to a general simple ensemble model. The ensemble model according to FIG. 6A may obtain an output value from each artificial intelligence model and ensemble the obtained output value. FIG. 6B illustrates an ensemble structure according to a Stepwise Ensemble model. The ensemble model according to FIG. 6B may not transmit an output value of ReLU layer to the next layer, but transmit a value obtained by ensemble the output value of each ReLU layer to the next layer. In this case, there is an effect of saving runtime memory. FIG. 6C illustrates an ensemble structure according to a Stepwise Partial Ensemble model. It is similar to the Stepwise Ensemble model, but when it is not appropriate to ensemble all layers as necessary, an ensemble model as illustrated in FIG. 6C may be used. FIG. 6D illustrates an ensemble structure according to a Cascade Partial Ensemble model. The cascade ensemble model may save memory as the number of artificial intelligence models decreases with each step. When there are a plurality of artificial intelligence models predicted to have similar result values, an ensemble model as illustrated in FIG. 6D may be used. FIG. 6E illustrates an ensemble structure according to a Stochastic Partial Ensemble model. When the ensemble model according to FIG. 6E is used, it may be easy to derive a stable result value.

The electronic apparatus 200 may select and apply various layer structures depending on the generated layer parameter, a current performance of the electronic apparatus 200, and the type and purpose of the artificial intelligence model.

Figure 7:
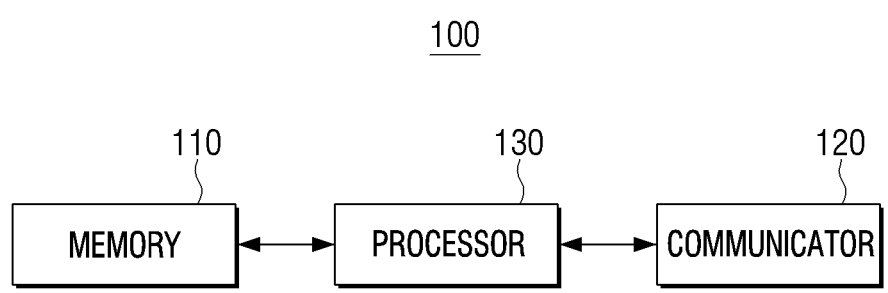
FIG. 7 is a block diagram schematically illustrating a configuration of a server according to an embodiment of the disclosure.

FIG. 7 is a block diagram schematically illustrating a configuration of a server according to an embodiment of the disclosure.

As illustrated in FIG. 7, the server 100 may include a memory 110, a communicator 120, and a processor 130. However, various configurations may be added in addition to the configuration described above.

The memory 110 may store a plurality of artificial intelligence models. The operation and configuration of the memory 110 is similar to the operation and configuration of the memory 220 of the electronic apparatus 200 described above. The memory 110 may store various artificial intelligence models.

The communicator 120 communicates with the electronic apparatus 200. The operation and configuration of the communicator 120 are similar to the operation and configuration of the communicator 210 of the electronic apparatus 200 described above.

The processor 130 is a component for controlling an overall operation of the display apparatus 100. The operation and configuration of the processor 130 may include the operation and configuration of the processor 230 of the electronic apparatus 200 described above.

Meanwhile, the processor 130 may include a data learning unit and a data recognition unit. The data learning unit may train the data recognition model to have a criterion according to a specific purpose. In this case, the specific purpose may include a purpose related to speech recognition, translation, image recognition, situation recognition, or the like. The data learning unit may generate a data recognition model having a criterion by applying the training data to the data recognition model in order to determine an operation according to the purpose described above. The data recognition unit may recognize circumstances for a specific purpose based on the recognition data. The data recognition unit may recognize circumstances from predetermined data using the learned data recognition model. The data recognition unit may recognize (or estimate) a predetermined circumstance based on the predetermined recognition data by acquiring predetermined recognition data according to a preset criterion and applying the obtained recognition data as an input value to a data recognition model. In addition, a result value output by applying the obtained recognition data the input value to the data recognition model may be used to update the data recognition model.

Meanwhile, at least a portion of the data learning unit and at least a portion of the data recognition unit may be mounted on the electronic apparatus by being implemented as a software module or manufactured in the form of at least one hardware chip. For example, at least one of the data learning unit and the data recognition unit may be manufactured in the form of a dedicated hardware chip for artificial intelligence (AI), or may be mounted on the variety of electronic apparatuses described above by being manufactured as a part of the existing general-purpose processor (e.g., CPU or application processor) or a part of the graphic-dedicated processor (e.g., GPU). In this case, the dedicated hardware chip for artificial intelligence is a dedicated processor specialized in probability calculation, and has higher parallel processing performance than the existing general-purpose processors, and thus quickly process calculation in artificial intelligence fields such as machine learning. When the data learning unit and the data recognition unit are implemented as software modules (or program modules including instructions), the software modules may be stored in non-transitory computer readable media. In this case, the software module may be provided by an operating system (OS) or a predetermined application. Alternatively, some of the software modules may be provided by the operating system (OS), and some of the software modules may be provided by a predetermined application.

In this case, the data learning unit and the data recognition unit may be mounted on one server 100 or may be mounted on separate servers. For example, one of the data learning unit and the data recognition unit may be included in the electronic apparatus 200 and the other may be included in an external server. In addition, the data learning unit and the data recognition unit may provide model information constructed by the data learning unit to the data recognition unit through wired or wireless communication, or data inputted to the data recognition unit may be provided to the data learning unit as additional learning data.

Meanwhile, the data learning unit may further include a data acquisition unit, a preprocessor, a training data selection unit, a model learning unit, and a model evaluation unit. The data acquisition unit is a component for acquiring learning data according to a specific purpose. The preprocessor is a component for preprocessing the data acquired by the acquisition unit in a predefined format. The learning data selection unit is a component for selecting data necessary for learning among the preprocessed data. The model learning unit is a component for training a data recognition model using training data. The model evaluation unit is a component for improving results of the data recognition model. At least one of the data acquisition unit, the preprocessor, the training data selection unit, the model learning unit, and the model evaluation unit, described above, may be implemented as a software module or manufactured in the form of at least one hardware chip to be mounted on the electronic apparatus. For example, at least one of the data acquisition unit, the preprocessor, the training data selection unit, the model learning unit, and the model evaluation unit may be manufactured in the form of a dedicated hardware chip for artificial intelligence (AI), or may be manufactured as a part of the general-purpose processor (e.g., CPU or application processor) or a graphics dedicated processor (e.g., GPU) to be mounted on the aforementioned various electronic apparatuses.

In addition, the data recognition unit may further include a data acquisition unit, a preprocessor, a recognition data selection unit, a recognition result providing unit, and a model updating unit. The data acquisition unit is a component for acquiring recognition data. The preprocessor is a component for preprocessing the data acquired by the acquisition unit in a predefined format. The recognition data selection unit is a component for selecting data necessary for recognition among the preprocessed data. The recognition result providing unit is a component capable of receiving data selected from the recognition data. The model updating unit is a component for updating the data recognition model based on an evaluation of the recognition result provided from the recognition result providing unit. At least one of the data acquisition unit, the preprocessor, the recognition data selection unit, the recognition result providing unit, and the model updating unit, described above, may be implemented as a software module or manufactured in the form of at least one hardware chip to be mounted on the electronic apparatus. For example, at least one of the data acquisition unit, the preprocessor, the training data selection unit, the model learning unit, and the model evaluation unit may be manufactured in the form of a dedicated hardware chip for artificial intelligence (AI), or may be manufactured as a part of the general-purpose processor (e.g., CPU or application processor) or the graphics dedicated processor (e.g., GPU) to be mounted on the aforementioned various electronic apparatuses.

In this case, the data recognition model may be either a single model or an ensemble model. In addition, the data recognition model may be constructed in consideration of an application field of the recognition model, the purpose of learning, a computer performance of the device, or the like. The data recognition model may be, for example, a model based on a neural network. The data recognition model may be designed to simulate human brain structures on a computer. The data recognition model may include a plurality of network nodes having weights that simulate neurons of human neural networks. The plurality of network nodes may form a connection relationship so as to simulate synaptic activity in which neurons transmit and receive signals through synapses. The data recognition model may include, for example, a neural network model or a deep learning model developed from the neural network model. In the deep learning model, the plurality of network nodes may exchange data according to a convolutional connection relationship while being located at different depths (or layers).

For example, models such as Deep Neural Network (DNN), Recurrent Neural Network (RNN) and Bidirectional Recurrent Deep Neural Network (BRDNN) may be used as a data recognition model, but is not limited thereto.

Meanwhile, the processor 130 may obtain a reference value for the electronic apparatus 200 to generate a layer based on the artificial intelligence model trained by the data learning unit and the data recognition unit described above.

In this case, the reference value may be an average value and a variance value of layer parameters with respect to layers at corresponding locations. The reference value may be variously determined depending on various conditions. In an embodiment, when the variance value of the plurality of layer parameters is less than or equal to a predetermined value, the reference value may be determined based on the average value of the plurality of layer parameters. In another embodiment, the reference value may be determined based on the variance values of the plurality of layer parameters when the variance value of the plurality of layer parameters is equal to or greater than the predetermined value, and the distribution of the plurality of layer parameters satisfies the predetermined condition. In another embodiment, the reference value may be determined based on the average value and the variance value of the plurality of layer parameters when the variance value of the plurality of layer parameters is equal to or greater than the predetermined value, and the distribution of the plurality of layer parameters does not satisfy the predetermined condition.

Specifically, the processor 130 may obtain a reference value based on the layer parameter included in the trained model. Specifically, referring to FIG. 1B, the processor 130 may obtain a reference value based on a layer parameter for the same path among layers included in a plurality of artificial intelligence models. For example, it may be assumed that the ensemble model includes three artificial intelligence models (a first artificial intelligence model to a third artificial intelligence model), and each artificial intelligence model has ten layer parameters (a first layer parameter to a tenth layer parameter). In this case, the n-th layer parameter of each artificial intelligence model may be a layer parameter having the same path.

In this case, the processor 130 may obtain a first reference value based on a first layer parameter of a first artificial intelligence model, a first layer parameter of a second artificial intelligence model, and a first layer parameter of a third artificial intelligence model. In addition, the processor 130 may obtain a second reference value based on a second layer parameter of the first artificial intelligence model, a second layer parameter of the second artificial intelligence model, and a second layer parameter of the third artificial intelligence model. In the same way, the processor 130 may obtain a third reference value to a tenth reference value. Hereinbelow, a process of processing one reference value will be described, but the technical idea of the disclosure may be applied even when a plurality of reference values exist.

In this case, the reference value may be obtained based on the average value or variance value of the layer parameter. However, the reference value may be determined through various methods. For example, the reference value may be obtained by using a Polygonal Chain (refer to Equation 1) or Bezier Curve (refer to Equation 2) with respect to layer parameters w1 and w2.

$$\Phi_\theta(t) = \begin{cases} 2(t\theta + (0.5 - t)w_1), & 0 \le t \le 0.5. \\ 2((t - 0.5)w_2 + (1 - t)\theta, & 0.5 \le t \le 1. \end{cases}$$ [Equation 1]

$$\Phi_\theta(t) = (1 - t)^2 w_1 + 2t(1 - t)\theta + t^2 w_2, \quad 0 \le t \le 1.$$ [Equation 2]

The reference value may be determined by the following equation.

$$p(w_{ij}) \propto \frac{1}{|w_{ij}|},$$ [Equation 3]

$$q(w_{ij}) = N(w_{ij} \mid \mu_{ij}, \alpha\mu_{ij}^2).$$

For convenience of description, in the disclosure, the reference value is limited to a case in which the reference value is obtained based on the average value or the variance value of the layer parameter. However, the reference value may be determined through various methods described above.

The processor 130 may determine a variance value for each layer parameter having the same path. In this case, when the variance value is lower than the predetermined value, the reference value may be obtained based on the average value of the layer parameter. In other words, since the meaning that the variance value is low refers to that a difference between each layer parameter and the average value is not that big, the processor 130 may obtain the reference value as the average value. The electronic apparatus 200 may receive the reference value from the server 100 and generate a layer parameter based on the reference value. In other words, when the variance value is lower than the predetermined value, the electronic apparatus 200 may receive and store only the reference value instead of receiving and storing all of the layer parameters from the server 100, and generate a plurality of layer parameters from the received reference value.

Meanwhile, when the variance value is greater than the predetermined value, the processor 130 may recognize whether a corresponding layer parameter satisfies a predetermined condition. In this case, the predetermined condition may be a condition related to an impact value of each layer parameter. For example, the processor 130 may generate a probabilistic function that generates a layer parameter by using a coefficient vector, according to the impact value. In other words, the processor 130 may obtain a probabilistic output value based on the output value of the layer with respect to the layer parameter value. The impact value refers to a specific value with respect to a layer parameter that affects a result value. For example, the impact value may be defined as follows.

$$\kappa_{ij} = o_{ij}^2 \frac{d^2}{dW_{ij}^2} [\log p(y \mid x, W, W_{net})] \mid_{W=M}$$ [Equation 4]

However, the impact value is not limited to Equation 4 described above, and may be applied to various values capable of distinguishing layer parameters that affect a result value.

In this case, when the impact value is greater than or equal to a predetermined value, the processor 130 may transmit a layer parameter having the impact value greater than or equal to the predetermined value to the electronic apparatus 200. In other words, since the layer parameter having the impact value greater than or equal to the predetermined value is a parameter that can affect the result value, the electronic apparatus 200 does not generate the layer parameter from the reference value, but may receive an original layer parameter from the server 100.

Meanwhile, when the impact value is less than or equal to the predetermined value, the processor 130 may delete the layer parameter having an impact value less than or equal to the predetermined value and replace it with a probabilistic layer function. In other words, since the layer parameter having the impact value less than or equal to the predetermined value does not significantly affect the result value, the electronic apparatus 200 may receive and store the reference value and the probabilistic layer function from the server 100, and generate a layer parameter from the received reference value and the layer function.

Through the method described above, the processor 130 may obtain a reference value and whether the predetermined condition is satisfied (e.g., an impact value) from a plurality of layer parameters, and the electronic apparatus 100 may generate a layer only with the reference value and the predetermined condition to save the memory of the electronic apparatus.

Figure 8:
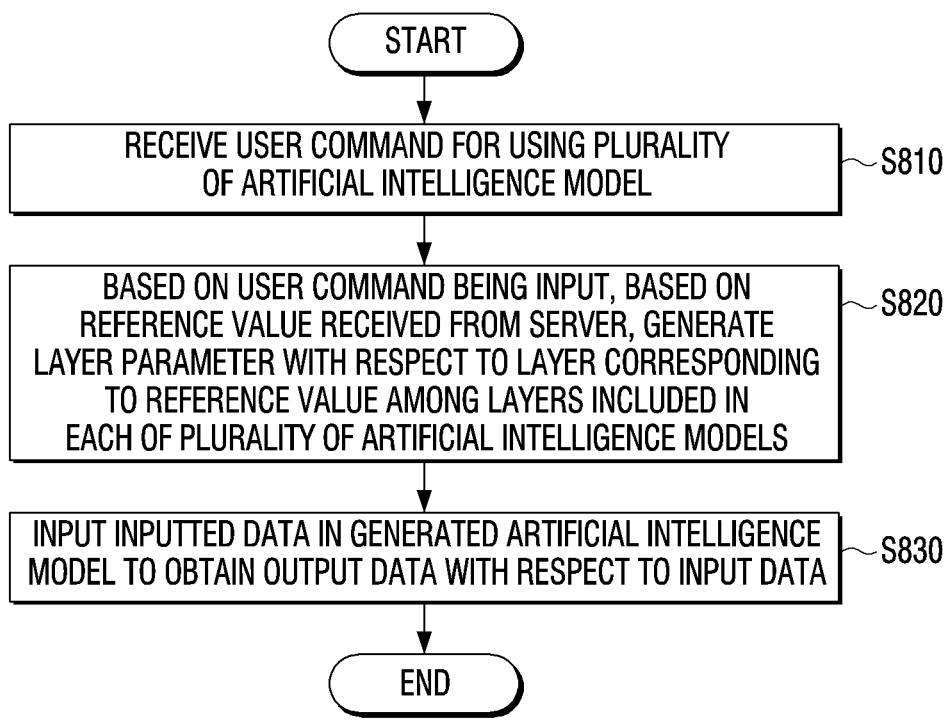
FIG. 8 is a flowchart illustrating an operation of an electronic apparatus according to an embodiment of the disclosure.

FIG. 8 is a flowchart illustrating an operation of an electronic apparatus according to an embodiment of the disclosure.

The electronic apparatus 200 may receive a user command for using a plurality of artificial intelligence models (S810). The user command for using the artificial intelligence model may refer to an application execution command using the artificial intelligence model. Alternatively, the user command for using the artificial intelligence model may refer to a user command for selecting input data input to the artificial intelligence model.

When a user command is input, the electronic apparatus 200 may generate a layer parameter with respect to a layer corresponding to a reference value among layers included in each of the plurality of artificial intelligence models based on the reference value received from the server 100 (S820). For example, it may be assumed that the plurality of artificial intelligence models are a first artificial intelligence model to an m-th artificial intelligence model, and each model is composed of a first layer to an n-th layer. The electronic apparatus 200 may generate m first layer parameter based on the first reference values with respect to the first layers of each of the first artificial intelligence model to the m-th artificial intelligence model, and generate m second layer parameter to n-th layer parameters in the same method.

The electronic apparatus 200 may obtain output data for the input data by inputting input data to the generated artificial intelligence model (S830). Specifically, when a layer parameter is generated, the electronic apparatus 100 may generate an artificial intelligence model according to a layer structure and an ensemble method. In this case, the layer structure may be received from the server 100 and stored. The ensemble method may also be received from the server 100 and stored, or may select and use an appropriate method according to circumstances of the electronic apparatus 200.

Figure 9:
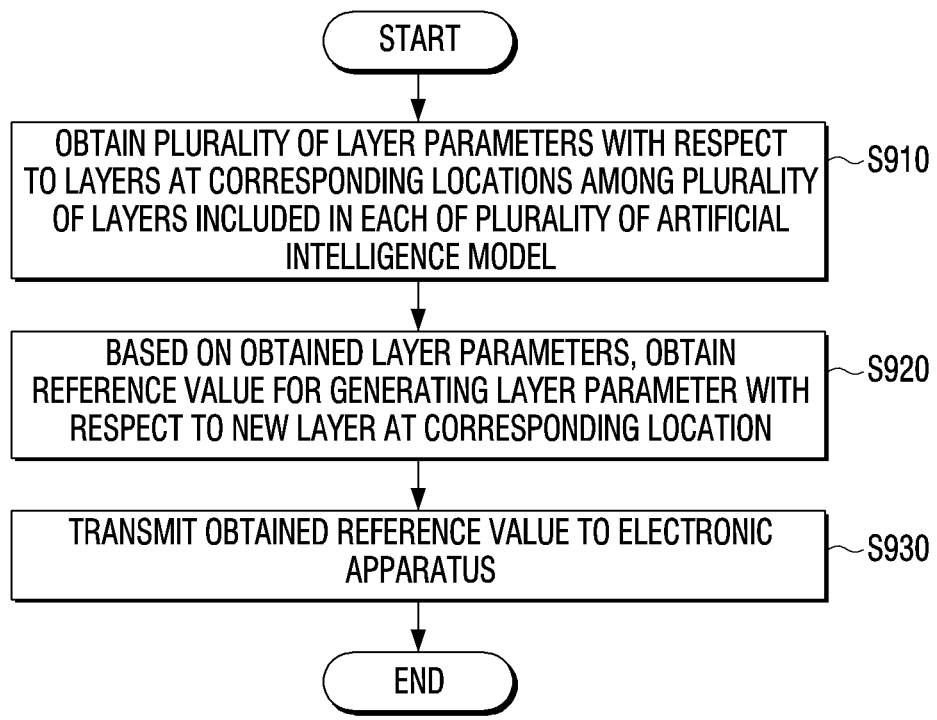
FIG. 9 is a flowchart illustrating an operation of a server according to an embodiment of the disclosure.

FIG. 9 is a flowchart illustrating an operation of a server according to an embodiment of the disclosure.

The server 100 may obtain a plurality of layer parameters for layers at a corresponding position among a plurality of layers included in each of the plurality of artificial intelligence models (S910). For example, it may be assumed that the plurality of artificial intelligence models are a first artificial intelligence model to an m-th artificial intelligence model, and each model is composed of a first layer to an n-th layer. In this case, the server 100 may obtain a first layer parameter for a first layer of the first artificial intelligence model, a first layer parameter for a first layer of a second artificial intelligence model to a first layer parameter for a first layer of an m-th artificial intelligence model.

The server 100 may obtain a reference value for generating a layer parameter for a new layer at a corresponding location based on the obtained layer parameter (S920). For example, the server 100 may obtain a reference value based on the obtained m layer parameters. In this case, the reference value may be an average value and a variance value form parameters.

The server 100 may transmit the obtained reference value to the electronic apparatus (S930). However, as described above, the server 100 may obtain an impact value in addition to the reference value and transmit it to the electronic apparatus 200.

Figure 10:
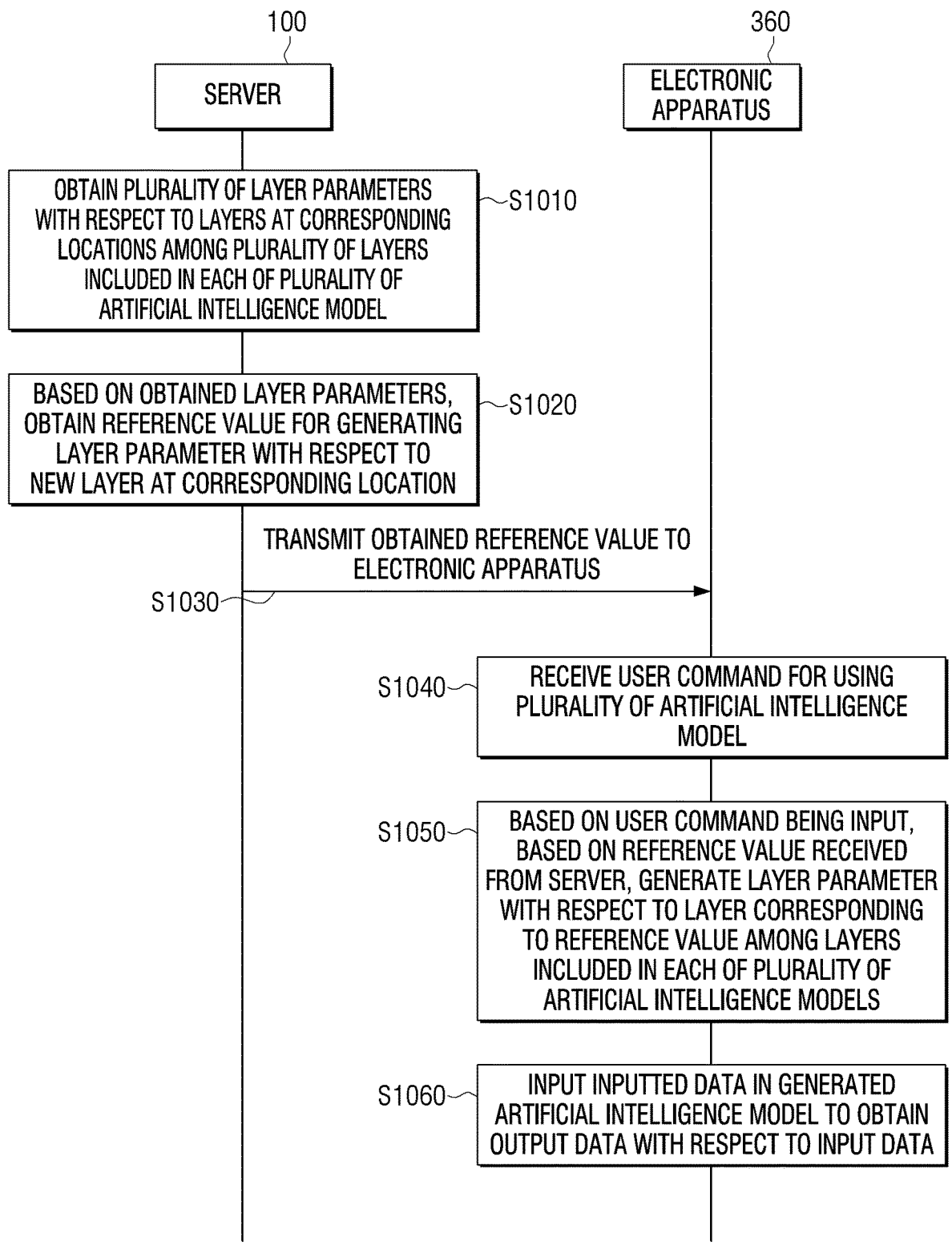
FIG. 10 is a system diagram illustrating an operation of a server and an electronic apparatus according to an embodiment of the disclosure.

FIG. 10 is a system diagram illustrating an operation of a server and an electronic apparatus according to an embodiment of the disclosure.

The server 100 may obtain a plurality of layer parameters with respect to layers at corresponding positions among a plurality of layers included in each of the plurality of artificial intelligence models (S1010).

The server 100 may obtain a reference value for generating a layer parameter for a new layer at a corresponding location based on the obtained layer parameter (S1020). The server 100 may transmit the obtained reference value to the electronic apparatus 200 (S1030).

The electronic apparatus 200 may receive a user command for using the plurality of artificial intelligence models (S1040).

When a user command is input, the electronic apparatus 200 may generate a layer parameter for a layer corresponding to the reference value among layers included in each of the plurality of artificial intelligence models based on the reference value received from the server 100 (S1050).

The electronic apparatus 200 may obtain output data for input data by inputting the input data to the artificial intelligence model generated based on the layer parameter (S1060).

It has been described that all the components constituting the exemplary embodiment are combined in one or are combined to operate, but this is not limited thereto. For example, at least one or more of all the components may be selectively combined to operate within the object scope. Each of the components may be implemented with one piece of independent hardware, but a part or all of the components may be selectively combined to be implemented with computer program having a program module which performs a part or all of functions combined in one or a plurality of pieces of hardware.

At least a part of a device (e.g., modules or functions thereof) or a method (e.g., operations) according to various embodiments may be implemented as a command stored in a non-transitory computer readable media in the form of a program module. When the command is executed by a processor (e.g., the processor 130), the processor may perform a function corresponding to the command.

The program is stored in the non-transitory computer readable media that, and read and executed by a computer, thereby implementing an embodiment of the disclosure.

The non-transitory computer readable media stores semi-permanently data and is a media that can be read by a device, and includes registers, caches, buffers, etc., and does not include transmission media such signals, currents, or the like.

Specifically, the programs described above may be stored and provided on a non-transitory readable recording medium such as a CD, DVD, hard disk, Blu-ray disk, USB, internal memory (e.g., memory 150), memory card, ROM, or RAM.

Also, the method according to the disclosed embodiments may be provided as a computer program product.

The computer program product may include a S/W program, a computer-readable storage medium in which the S/W program is stored, or a product may be exchanged between a seller and a purchaser.

For example, a computer program product may include an electronic apparatus, or a product in the form of S/W program (e.g., a downloadable app) electronically distributed through a manufacturer of the electronic apparatus or an electronic market (e.g., Google Play Store, App Store). For electronic distribution, at least a part of the S/W program may be stored in a storage medium or may be temporarily generated. In this case, the storage medium may be a server of a manufacturer or an electronic market, or a storage medium of a relay server. In the configuration of on-line distribution, at least a portion of the S/W program product may be stored, or generated temporarily in a storage medium such as a manufacturer's server or an electronic market's server, or a medium of a relay server.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of controlling an electronic apparatus for generating an artificial intelligence model, the method comprising:
    based on receiving, by the electronic apparatus, a user command for using the artificial intelligence model, identifying, by the electronic apparatus, a memory capacity of the electronic apparatus;
    based on the identified memory capacity of the electronic apparatus, identifying, by the electronic apparatus, a number of artificial intelligence models;
    generating, by the electronic apparatus, a plurality of artificial intelligence models based on the identified number of the artificial intelligence models;
    obtaining, by the electronic apparatus, output data by inputting input data to the plurality of artificial intelligence models; and
    outputting, by the electronic apparatus, a result value by ensembling the output data obtained from the plurality of artificial intelligence models,
    wherein the generating of the plurality of artificial intelligence models includes:
        receiving, from a server, a reference value for obtaining a plurality of layer parameters with respect to layers at corresponding locations among a plurality of layers included in each of the plurality of artificial intelligence models without receiving, from the server, the plurality of artificial intelligence models, and
        based on the received reference value, generating the layers at corresponding locations among the plurality of layers included in each of the plurality of artificial intelligence models,
    wherein the generating of the plurality of artificial intelligence models further includes generating a layer scheme of the plurality of artificial intelligence models based on the received reference value,
    wherein the reference value is determined based on an average value and a distribution value of the plurality of layer parameters with respect to the layers at corresponding locations, and
    wherein, based on the distribution value of the plurality of layer parameters being less than or equal to a predetermined value, the reference value is determined based on the average value of the plurality of layer parameters.

2. The method of claim 1, comprising:
    based on the distribution value of the plurality of layer parameters being greater than or equal to the predetermined value, identifying a distribution of the plurality of layer parameters; and
    based on the distribution satisfying a predetermined condition, obtaining a reference value based on the distribution value of the plurality of layer parameters.

3. The method of claim 2, comprising:
    based on the distribution not satisfying the predetermined condition, obtaining a reference value based on the average value of the plurality of layer parameters, and the distribution value of the plurality of layer parameters.

4. The method of claim 1, wherein the outputting the result value comprises at least one of averaging the output data or performing a weighted sum on the output data.

5. An electronic apparatus for generating an artificial intelligence model, the apparatus comprising:
    a communicator;
    a memory; and
    a processor configured to:
        based on receiving a user command for using the artificial intelligence model, identify a memory capacity of the electronic apparatus;
        based on the identified memory capacity of the electronic apparatus, identify a number of artificial intelligence models,
        generate a plurality of artificial intelligence models based on the identified number of the artificial intelligence models,
        obtain output data with respect to input data by inputting the input data to the plurality of artificial intelligence models, and
        outputting a result value by ensembling the output data obtained from the plurality of artificial intelligence models,
    wherein the processor is further configured to:
        receive, from a server, via the communicator, a reference value for obtaining a plurality of layer parameters with respect to layers at corresponding locations among a plurality of layers included in each of the plurality of artificial intelligence models, and
        based on the received reference value, generate the layers at corresponding locations among the plurality of layers included in each of the plurality of artificial intelligence models,
    wherein the processor is further configured to generate a layer scheme of the plurality of artificial intelligence models based on the received reference value,
    wherein the reference value is determined based on an average value and a distribution value of the plurality of layer parameters with respect to the layers at corresponding locations, and
    wherein, based on the distribution value of the plurality of layer parameters being less than or equal to a predetermined value, the reference value is determined based on the average value of the plurality of layer parameters.

6. The apparatus of claim 5, wherein the processor is configured to, based on the distribution value of the plurality of layer parameters being greater than or equal to the predetermined value, identify a distribution of the plurality of layer parameters, and based on the distribution satisfying a predetermined condition, obtain a reference value based on the distribution value of the plurality of layer parameters.

7. The apparatus of claim 6, wherein the processor is configured to, based on the distribution not satisfying the predetermined condition, obtain a reference value based on the average value of the plurality of layer parameters, and the distribution value of the plurality of layer parameters.

8. The electronic apparatus of claim 5, wherein the processor is further configured to obtain the result value by using at least one of averaging the output data or performing a weighted sum on the output data.

* * * * *